(12) United States Patent
Berg et al.

(10) Patent No.: US 11,876,685 B1
(45) Date of Patent: Jan. 16, 2024

(54) LOCALLY PREDICTING STATE USING A COMPONENTIZED ENTITY SIMULATION

(71) Applicant: Amazon Technologies, Inc., Seattle, WA (US)

(72) Inventors: Karl Berg, Vancouver (CA); Joseph Pease, San Diego, CA (US); Neema Teymory, Vancouver (CA); Alan Krause, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 17/325,146

(22) Filed: May 19, 2021

(51) Int. Cl.
*H04L 41/147* (2022.01)
*A63F 13/335* (2014.01)
*H04L 45/7453* (2022.01)
*H04L 43/106* (2022.01)
*H04L 41/14* (2022.01)

(52) U.S. Cl.
CPC .......... *H04L 41/145* (2013.01); *A63F 13/335* (2014.09); *H04L 41/147* (2013.01); *H04L 43/106* (2013.01); *H04L 45/7453* (2013.01)

(58) Field of Classification Search
CPC ... H04L 41/145; H04L 41/147; H04L 43/106; H04L 45/7453; A63F 13/335
See application file for complete search history.

(56) References Cited

U.S. PATENT DOCUMENTS

| | | | |
|---|---|---|---|
| 6,208,357 B1 * | 3/2001 | Koga | G06T 13/40 345/473 |
| 8,678,929 B1 * | 3/2014 | Nishimura | A63F 13/798 463/31 |
| 9,266,025 B2 | 2/2016 | Hall | |
| 10,159,901 B2 | 12/2018 | Justice et al. | |
| 10,967,259 B1 * | 4/2021 | Berg | A63F 13/352 |
| 2004/0143852 A1 | 7/2004 | Meyers | |
| 2008/0026838 A1 | 1/2008 | Dunstan et al. | |
| 2009/0318223 A1 | 12/2009 | Langridge et al. | |
| 2014/0249749 A1 * | 9/2014 | Hall | A63F 13/45 701/465 |
| 2020/0218838 A1 | 7/2020 | Boulkenafed et al. | |
| 2022/0203238 A1 * | 6/2022 | Cournoyer | A63F 13/57 |

OTHER PUBLICATIONS

U.S. Appl. No. 17/325,145, filed May 19, 2021, Karl Berg et al.
U.S. Appl. No. 17/351,094, filed Jun. 17, 2021, Karl Berg.

* cited by examiner

*Primary Examiner* — James E Springer
*Assistant Examiner* — Patrick F Ngankam
(74) *Attorney, Agent, or Firm* — Robert C. Kowert; Kowert, Hood, Munyon, Rankin & Goetzel, P.C.

(57) ABSTRACT

A simulation environment (e.g., multi-player game) hosted by a provider network may implement componentized entities to reduce the amount of resource usage for a simulation (e.g., by reducing the amount of input/state data transmitted through the use of dynamically changing input structures). A user may add or remove any number of components to an entity that is simulated at the local client device. When inputs are received for one or more components, values for predictive states are locally determined for each component. An input packet is generated and sent to the provider network, which includes the inputs as well as data that is based on the values for the locally predicted states (e.g., a fingerprint or other unique ID). If necessary, a correction packet may be generated at the provider network and sent back to the client.

20 Claims, 11 Drawing Sheets

Entity A
602

| Movement Component | 604 |
|---|---|
| Input types | Predictive State |
| move forward<br>move backward<br>move left<br>move right | Position |

| Rotation Component | 606 |
|---|---|
| Input types | Predictive State |
| rotate left<br>rotate right<br>rotate up<br>rotate down | Orientation |

| Ball Throw Component | 608 |
|---|---|
| Input type | Predictive State |
| throw ball | hit or miss target entity |
| ball colors, texture – non-predictive states ||

↓ remove movement component from entity A

Entity A
602

| Rotation Component | 606 |
|---|---|
| Input types | Predictive State |
| rotate left<br>rotate right<br>rotate up<br>rotate down | Orientation |

| Ball Throw Component | 608 |
|---|---|
| Input type | Predictive State |
| throw ball | hit or miss target entity |
| ball colors, texture – non-predictive states ||

FIG. 6

LOCALLY PREDICTING STATE USING A COMPONENTIZED ENTITY SIMULATION

BACKGROUND

Computer simulations are used to simulate different types of objects and environments. For example, a provider network may host a multi-player game that simulates a world in which each player can control an entity (e.g., a simulation of a person) to perform a variety of actions. For example, a player may provide inputs to a client device (e.g., keyboard inputs on a PC) that cause the entity to run in a particular direction or to throw a ball at another entity of the simulation.

When a player provides inputs to a client device, a certain amount of time is required for the host provider network to receive the inputs, to process the inputs, and to send results of the processing back to the client device in order to update the display at the client device. In order to avoid the delays to update the display, the client device may locally predict results of inputs and immediately update the display based on the local predictions, while at the same time sending an input packet to the host provider network so that the simulation can be updated based on the inputs. For certain entities, the input packet that is sent to the host provider network may be much larger than is needed (e.g., due to a standard input data structure). For example, an entity may use a small number of inputs that does not make use of the large number of input fields of a standard input packet. Moreover, for large simulations with many entities, the host provider network may need to update the state for a large number of entities, placing a heavy burden on simulation servers. As a result, the performance of the simulation may be degraded and the user experience of the simulation may be negatively impacted.

BRIEF DESCRIPTION OF THE DRAWINGS

FIG. 6 is an illustration of changing components of an entity, according to some embodiments.

Figure 1:
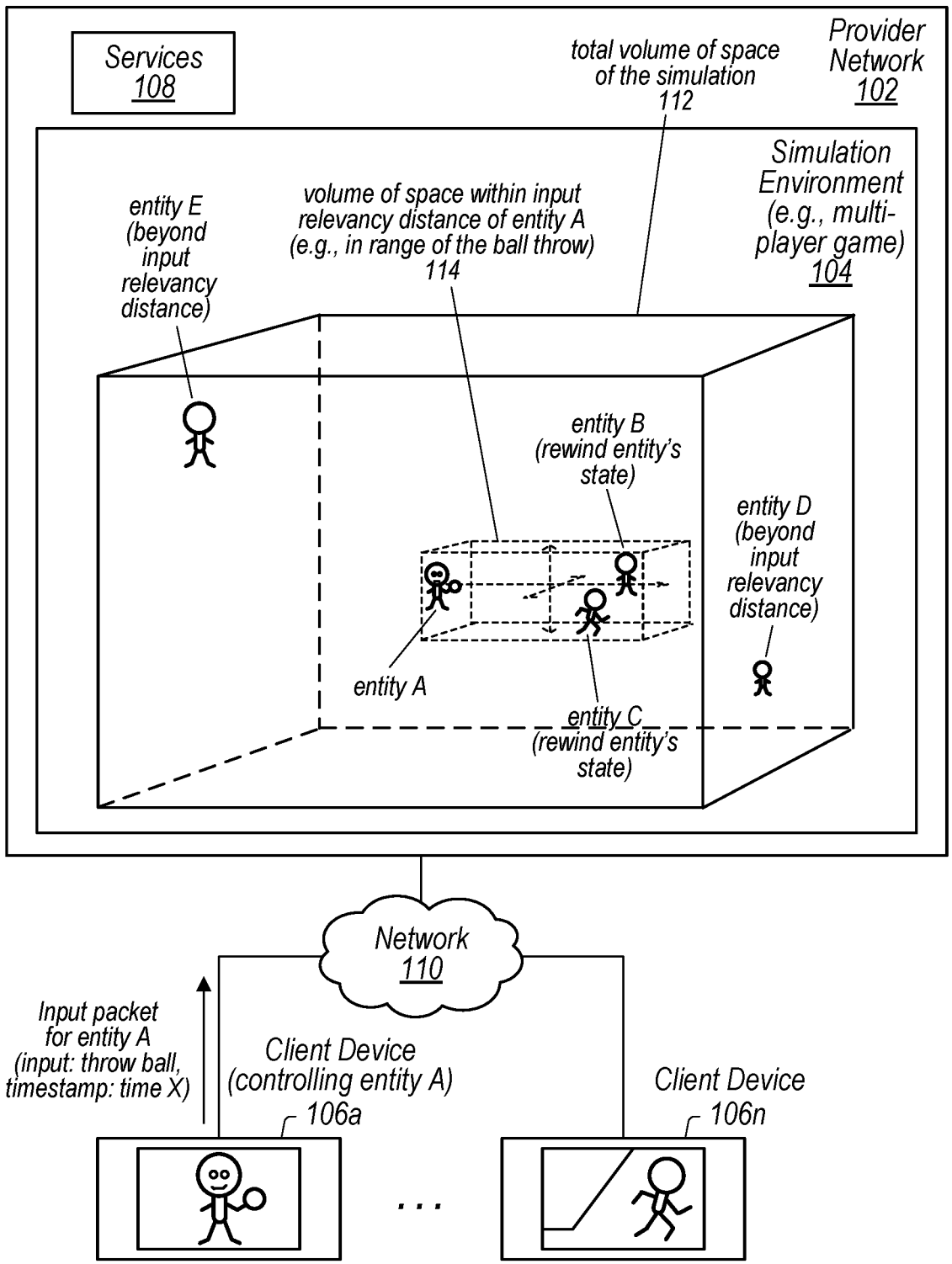
FIG. 1 is a logical block diagram illustrating a system for constraining the amount of simulation state to rewind based on input relevancy distance, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to constrain the amount of simulation state to rewind based on input relevancy distance or to locally predict state using a componentized entity simulation, according to some embodiments. In embodiments, constraining the amount of simulation state to rewind based on input relevancy distance or locally predicting state using a componentized entity simulation may reduce the amount of resource usage for a simulation at a host provider network and may reduce the amount of time to update simulation state at a client device and/or host provider network, compared to other techniques.

In embodiments, instead of relying on a remote server of a provider network to simulate an entity's behavior based on local user inputs, a client device performs local prediction based on the user inputs and displays the entity's behavior (e.g., the resulting entity state). This avoids the lag that would be introduced if the client device had to send the inputs to a remote server and wait for the remote server to simulate the behavior and then transmit the resulting entity state back to the client device.

In some embodiments, the remote server at the provider network may still process the user input by rewinding the state of other entities based on a timestamp of the user input (e.g., rewinding the state of the other entities back by a few hundred milliseconds) and then simulating the entity's interactions with the other entities based on the user input (e.g., performing backward reconciliation). If the resulting entity state is the same as the locally predicted state at the client device, then no correction is needed for the client device. However, if the resulting entity state at the provider network is different than the locally predicted state at the client device, then the server may transmit a correction packet to the client device in order to update the entity's state to the correct state at the client device. The process of rewinding state of the simulation at the provider network and then simulating rewound entities taking into account user inputs can place a heavy computing load on the simulation server, especially when the state for a large number of entities needs to be rewound.

Using embodiments described herein, the number of entities that are rewound and simulated for a given input packet may be reduced, reducing the load on simulation servers. Moreover, embodiments may implement componentized entities to reduce the size of input packets that are transmitted to host provider networks, resulting in less network traffic and less usage of network resources. As a result, the simulation may be provided and displayed on a client device with fewer errors and with much less lag or no lag (e.g., jerkiness in a displayed game), compared to traditional methods.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 11 and described below.

This specification begins with a description of a system for constraining the amount of simulation state to rewind based on input relevancy distance. A number of different methods and techniques to provide a simulation and to constrain the amount of simulation state to rewind based on input relevancy distance are discussed, some of which are illustrated in accompanying flowcharts. A number of different methods and techniques to locally predict state using a componentized entity simulation are also discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for constraining the amount of simulation state to rewind based on input relevancy distance, according to some embodiments.

As shown, a service provider network 102 includes a simulation environment 104 that may implement a simulation of an environment/world (e.g., a world for a multi-player game) that may be displayed on any number of remote client devices 104 for viewing by users (e.g., players of a multi-player game). The provider network may include any number of services 108 that may be used by the simulation environment and/or clients (e.g., compute services, storage services). For example, the simulation environment may use any number of servers and/or compute instances of a compute service to execute some or all of a simulation. As another example, the simulation environment may use storage devices of a storage service to store data used for the simulation, such as state data for different entities. In embodiments, some or all of the compute functionality (e.g., physical and/or virtual servers/compute instances) or storage functionality (e.g., storage devices/databases) may be implemented by the simulation environment itself. In embodiments, the simulation environment 104 may be considered one of the services offered by the provider network.

The client devices may access the provider network 102, including the simulation environment and other services 108, by communicating with the provider network 102 via a wide area network 110 (e.g., the internet). Any number of the client devices may be stand-alone devices (e.g., a smart phone or other mobile device) or a PC that is part of a local client network (e.g., a private network at a user's home).

In the depicted embodiment, the simulation environment 104 implements a simulation of a physical volume 112 of space (e.g., a 3D world in which different entities may interact). Although the example depicts a rectangular or cube shape, in various embodiments the volume 112 may be any shape, may not have a fixed shape or boundary, and/or may change in shape or size. In some embodiments, a 2D world may be simulated, in which two of the dimensions would apply.

As shown, the simulation environment receives an input packet for entity A from client device 106a. The input packet specifies an input of "throw ball" and a timestamp of "time X." In embodiments, an input packet may specify any number of inputs for an entity and/or any number of timestamps for the inputs. Time X may indicate/correspond to a time (or time period) of the simulation at which the input(s) of the input packet are to be applied in the simulation. In some embodiments, the timestamp may indicate a particular frame of the simulation, such that the state of one or more entities would change from frame 1000 to frame 1001, depending on how the simulation processes the received input(s) (e.g., frame 1001 would be displayed immediately after frame 1000, representing a certain amount of time passes between each frame). In various embodiments, the timestamp may specify a time or frame according to any particular time format or resolution suitable for identifying a particular time (or time period) of the simulation (e.g., specifying a particular second, tenth of a second, a particular frame/processing loop, etc.).

In response to receiving the input packet from entity A, the simulation environment may determine a relevancy distance of the input. For example, the simulation environment may determine the relevancy distance of the input based on a list of inputs and corresponding relevancy distances maintained for the simulation (e.g., stored by the simulation environment). For example, the "throw ball" input may correspond to a relevancy distance of 10 meters in the direction that the entity is facing (e.g., indicating that the ball will travel 10 meters during a particular time or time period of the simulation).

The simulation environment may determine, based at least on the relevancy distance of the input and a previous state of entity A corresponding to the timestamp, a volume 114 of space of the simulation that may be affected by the input (e.g., less than the total volume 112 of space of the simulation). In embodiments, the simulation environment may store a history of different states of entities (e.g., position of different entities, movement of the entities) along with the corresponding timestamp for each state of the entities. The simulation may take into account any number of factors/states of a given entity (e.g., entity A) that affect results of the input to determine the volume of space that may be affected by the input, such as a position/orientation of the entity according to the timestamp for when the "throw ball" input is to be processed. In an embodiment, the direction that the entity was facing according to the timestamp and/or the direction/speed of movement of the entity according to the timestamp may be taken into account to determine the volume of space (or to further reduce the volume of space of the simulation that may be affected by the input). In some embodiments, the state of the entity, the relevancy distance of the input, and/or any other data associated with the input or entity may be included in the input packet.

In some embodiments, the relevancy distance assigned to a given type of input may actually be based on two or more relevancy distances assigned to the input. For example, the "throw ball" input may correspond to a first relevancy distance of 10 meters in the direction the entity is facing and a second relevancy distance of one meter extending out from the ball in all directions. These two distances may result in a volume of space in the shape of a tube/cylinder with a one meter radius that extends from the entity in the direction the entity is facing, out to a length of 10 meters.

In embodiments, the relevancy distance assigned to a given input may be a volume that is assigned to the given input. For example, a 10 meter long tube with a one meter radius may be assigned as the relevancy distance for a "throw ball" input that extends from the entity (or from a origin point or origin plane assigned to the input) in the direction the entity is facing, out to a length of 10 meters. Another entity may be identified as within the volume of space (and therefore rewound) if the other entity is at any location within that input relevancy distance (e.g., within 10 meter long tube). The entity may be considered within the relevancy distance if a position of the entity (e.g., based on the x, y, z coordinates of the entity's position) is within the relevancy distance (e.g., within the volume of the 10 meter long tube). As discussed below, in some embodiments a union of different input relevancy distances (volumes) may be performed and entities located within the resulting volume are rewound. If only one input relevancy distance is used, then the volume indicated as the input relevancy distance (e.g., a tube shape volume) may be used and any identified entities within that volume are rewound.

Any number of factors/inputs for the simulation may affect a relevancy distance/volume (or individual relevancy distances for the input that determine the volume). For example, a simulation of wind blowing against the direction the ball is thrown may cause the first relevancy distance to be reduced to 9 meters, resulting in a smaller relevancy distance/volume. If the ball is thrown to the east, a simulation of wind blowing to the north may cause at least a portion of the relevancy distance/volume to be moved towards the northern direction. The state of the entity may increase, decrease, and/or change the location of the relevancy distance/volume. For example, if an entity is running in the same direction as the ball is thrown, then a "velocity" state of the entity may be taken into account and the simulation server may determine, based on the velocity, to increase the size of the relevancy volume by a certain amount (e.g., adding an additional meter to the length of the tube-shaped volume). Therefore, the relevancy distance/volume may dynamically change over time, depending on the changing state of the entity over time (e.g., running, then stopping, changing direction).

In the depicted embodiment, entity B and entity C are located within the volume of space that may be affected by the "throw ball" input because they are located within the relevancy distance (e.g., relevancy volume) of the position of entity A at the time entity A threw the ball. As shown, entity D and entity E are located outside of the volume of space because they are located beyond the relevancy distance of the position of the entity A according to the timestamp.

In embodiments, the simulation environment identifies the other entities (e.g., other than entity A) that are currently located within the relevancy volume of space (e.g., entities B and C) and then rewinds the state of those entities to a previous state corresponding to the timestamp for entity A's input (throw ball). In some embodiments, the simulation environment identifies the other entities that were within the relevancy volume of space at the time corresponding to the timestamp of entity A's input (throw ball) and then rewinds those identified entities to the previous state corresponding to that times. To do so, the simulation environment may maintain a rewindable state (e.g., including at least the state of entity positions) of the relevancy volume and determines, based on the rewound state of the relevancy volume, that entities B and C were located within the relevancy volume as of the time corresponding to the timestamp for entity's A's input. In embodiments, the simulation server(s) may maintain the rewindable state (e.g., at least the entity positions) for any portion of the total volume 112 or the entire total volume 112.

In the depicted embodiment, the state of entity A does not need to be rewound because entity A's state is already at the correct state that corresponds to the timestamp for entity A's input (e.g., the simulation at the server has not yet advanced entity A to a later state because the server was waiting to receive/process the input for entity A). The state of the entities located outside of the volume (e.g., entities D and E) is not rewound to a previous state corresponding to the timestamp (since entities D and E are not within the volume of space, the throw ball input will not affect them).

After entities B and C are rewound, the simulation environment determines the next state of entity A based on the input(s), the state of entity A, and the previous state (rewound state) of entities B and/or C. For example, the next state of entity A may include a state of "ball hits entity B" or "ball misses entity B." The simulation may then apply the next state to entity A. In some embodiments, a correction packet may be generated and sent to the client device, as described below.

In embodiments, the simulation environment also determines the next state of entity B and/or entity C based on the input(s), the state of entity A, and the previous state (rewound state) of entities B and/or C. For example, the next state of entity B may include a state of "hit by ball thrown by entity A" or "missed by ball thrown by entity A." The simulation may then apply the next state of entity B and/or entity C. As described herein, different servers may implement the simulation environment, and each server may have authority/control over different entities. If server A has authority over entity A and server B has authority over entity B, then to rewind entity B, server A may identify proxy data for the entity B that indicates the previous state of entity B corresponding to the timestamp. The proxy data for entity B may be previously received from server B and stored at server A (e.g., proxy data for entity B may be updated at server A over time).

In some embodiments, if server A determines that the input impacts the state of entity B, then server A may indicate to server B the impact to the state. For example, server A may send a function call to entity B (e.g., make a remote procedure call to entity B and/or to server B). The function call may indicate the input(s) that impacted entity B, the next states of entity B as determined by server A, and/or the corresponding timestamp. Server B may update the state of entity B by applying/simulating the input(s). In embodiments, server B may apply the next state of entity B as determined by server A (e.g., entity B was hit by the ball), because server B trusts the resulting state determined by server A.

Figure 2:
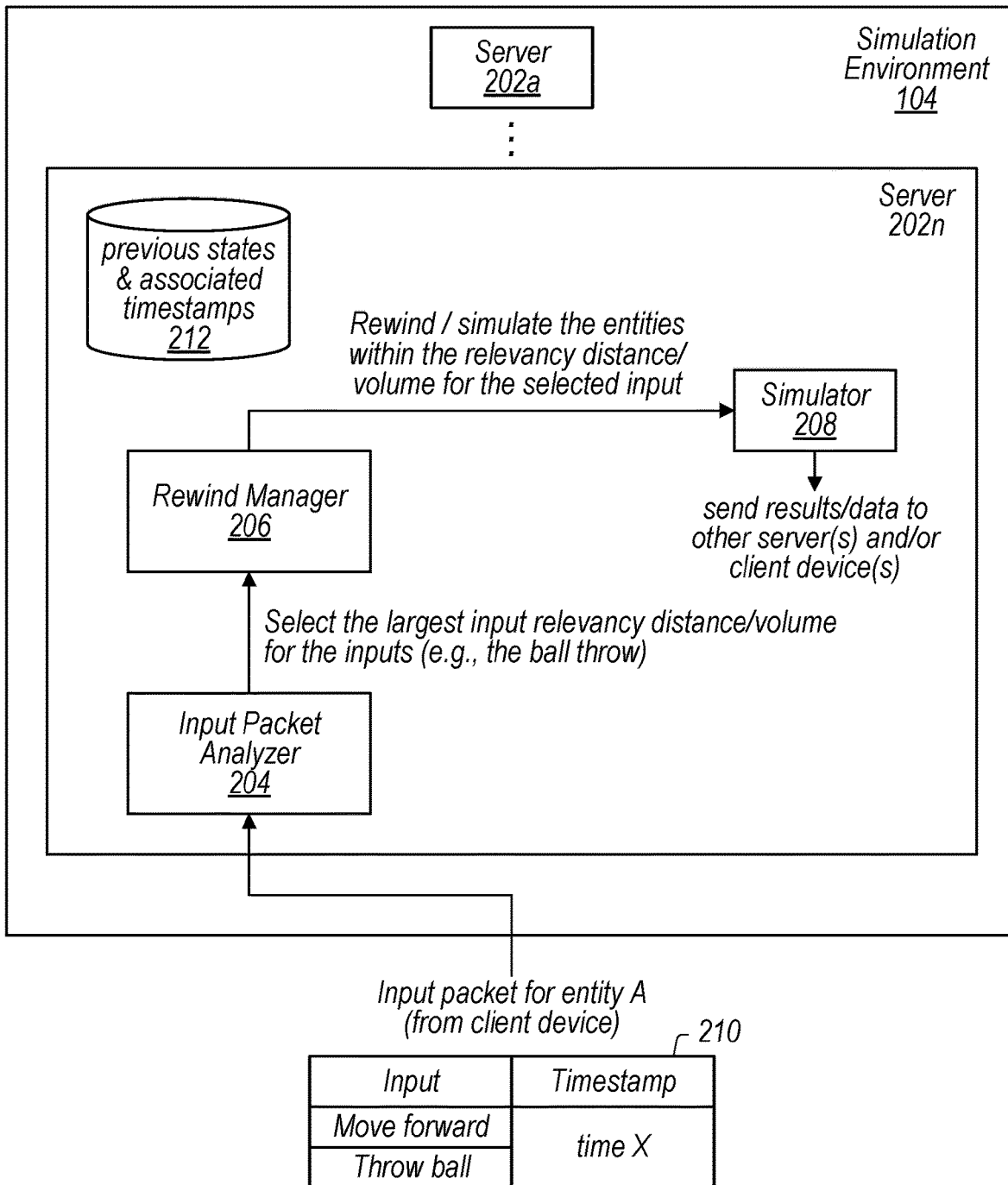
FIG. 2 is an illustration of a process for constraining the amount of simulation state to rewind based on input relevancy distance, according to some embodiments.

FIG. 2 is an illustration of a process for constraining the amount of simulation state to rewind based on input relevancy distance, according to some embodiments.

In the depicted embodiment, the simulation environment 104 may include a fleet of any number of servers 202 that implement a simulation for clients/client devices. In various embodiments, the servers may be physical servers and/or virtual servers (e.g., implemented by a compute instance). In embodiments, the number of servers may increase or decrease, depending on the load/processing required for the simulation (e.g., additional servers may be added as more clients join a game).

As shown, the server 202*n* includes an input packet analyzer 204, a rewind manager 206, and a simulator 208 that may perform various functions/operations of the simulation based on receiving an input packet 210 for an entity of the simulation (e.g., entity A of FIG. 1). The servers may also store any number of previous states and associated timestamps 212 in a data store (e.g., volatile memory and/or hard disk).

In the example embodiment, the input packet 210 specifies a "move forward" input and a "throw ball" input, as well as the timestamp for the inputs. In some embodiments, an input packet may have different timestamps for different inputs (in that case, the simulation environment may first simulate the inputs for the first timestamp, then the other inputs for later timestamps).

The input packet analyzer 204 may determine a relevancy distance and/or volume for each of the inputs (e.g., obtaining relevancy distances assigned to each of the inputs, maintained/stored by the simulation environment for the simulation). For example, the analyzer may determine the relevancy distance for "move forward" is one meter in front of entity A and the relevancy distance for "throw ball" is 10 meters in front of entity A. The input packet analyzer may select the largest relevancy distance from among the different relevancy distances (e.g., 10 meters). In embodiments, the analyzer may determine that the relevancy volume for "throw ball" is larger than the relevancy volume for "move forward" and therefore select the relevancy volume for the "throw ball" input. In an embodiment, the largest relevancy volume may encompass one or more of the smaller relevancy volumes (e.g., the relevancy volume for "throw ball" may be a tube-shaped volume that encompasses the relevancy volume for "move forward," which may be a smaller tube-shaped volume).

The rewind manager may determine, based at least on the largest relevancy distance (e.g., 10 meters), a volume of space of the simulation (the relevancy volume). For example, the rewind manger may determine a volume of space (e.g., a tube/cylinder or other volume) that extends 10 meters to the right of entity A, as in FIG. 1. In embodiments, the volume of space may extend 10 meters in all directions to form a sphere (e.g., if the input is an explosion, sound, or other omni-directional input). In various embodiments, any other formula, technique, or additional factors may be used to determine the volume of space (e.g., any number of environmental factors).

In some embodiments, the rewind manager may determine the relevancy volume of space to be a combination of two or more different relevancy volumes for two or more different inputs. For example, a first volume may be determined based on the ball throw input and a second volume may be determined for a punch that is thrown to the right of the entity. The rewind manager may determine the volume of space by combining first volume and the second volume (e.g., forming a union of the two different volumes). In embodiments, any number of relevancy volumes may be combined by the rewind manager to determine the volume of space.

In embodiments, relevancy volume may be a union of any number of different volumes, and one or more of those volumes may not be connected to other volume(s). For example, for an entity that is running (e.g., a player/character in a game), the rewind manager may rewind a volume around the entity with respect to player position and velocity, and the rewind manager may rewind another volume (or set of volumes) around each bullet(s) using the bullet's position and velocity. Therefore, the rewind manager may determine the relevancy volume of space to be a combination of two or more different relevancy volumes for two or more different inputs (e.g., a move forward input and a gun fire input), and the relevancy volume of space may be a union of one or more volumes around one or more bullets and another volume around the player's position (e.g., forming a relevancy volume that includes any number of disconnected relevancy volumes corresponding to any number of respective inputs).

After determining the volume of space, the rewind manager may then rewind state for any other entities within the volume of space. The simulator 208 may then simulate the other entities based on the previous states and generate/apply results to any number of the entities under authority of server 202*n*, including entity A). If the state of one or more other entities under authority of one or more other servers was impacted/changed, then the server 202*n* may send one or more function calls that indicate the inputs and/or the impact/change to the other entity's state. If the state of entity A is different than a predicted state of entity A that was predicted by the client device (e.g., based on a non-matching state fingerprint as described below), then the simulator may send a correction packet to the client device.

Figure 3:
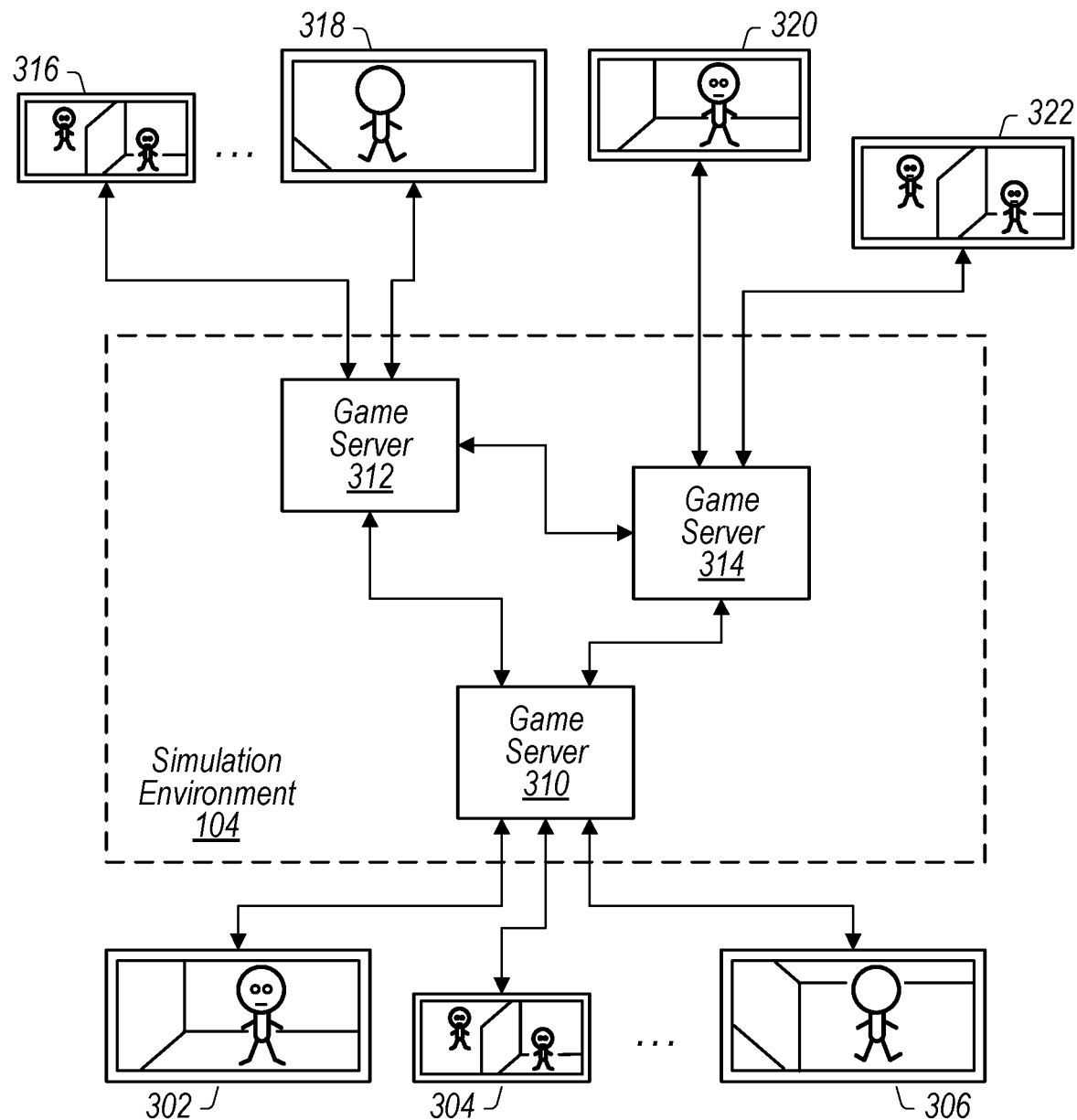
FIG. 3 is a logical block diagram illustrating a system for implementing a simulation environment, according to some embodiments.

FIG. 3 is a logical block diagram illustrating a system for implementing a simulation environment, according to some embodiments.

In the depicted example, the simulation environment 308 implements a simulation as a game session for a multiplayer game. There are multiple player devices 302, 304, 306, 316, 318, 320, 322 participating in a multiplayer gaming session hosted by resources of a simulation environment 308 (e.g., environment 104). In embodiments, the player devices may be examples of the client devices 106 of FIG. 1. The hosting can be performed using a set of game servers 310, 312, 314 each corresponding to software running on at least one processing instance, or other computing resource, offered through the game hosting environment 104. The processing instances can be any appropriate type of processing resource, such as a physical or virtual server or machine instance as discussed herein. A processing instance can store and execute code for various processes for a gaming session, such as to function as a game server for some or all players for an active game session. The player devices transmit event data, corresponding to input of a player to a respective device, over at least a network (e.g., network 110) that is received and directed to an appropriate game server.

Multiple players can utilize their respective devices to connect to an appropriate game server for the active game session. The player devices can join in a session of the game with state data that is managed by a game state component of the relevant game server. In some embodiments, players can join an existing session in process, and leave during the session, such that the number of players may vary over time. The player devices can include specific gaming devices, such as gaming consoles or handheld consoles, or other computing devices such as smart phones, tablet computers, wearable computers (e.g., smart glasses or watches), desktop or notebook computers, and the like. Event information can be transmitted from the player devices at appropriate times, such as periodically, in response to certain actions or occurrences in the game, in response to requests from the server, or at other appropriate times. The game server(s) can maintain the game state information such that the game state is consistent across the various player devices, as well as to enable a saving or restoring of the game for any or all of the devices.

In many situations, the player devices will be at different geographical locations. In order to ensure that all the game state information utilized by the player devices is accurate, player input in many cases will be transmitted from the individual player devices to the relevant game server, such that the game state can be updated and propagated to the various player devices so the devices are all utilizing consistent game state information. As discussed above, such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball, a first player might direct the action towards a last known location received for a target player. The action may be to miss, as the other player may have moved since the last received location such that the first player may see the action take place but the action will actually fail because when the game state data is synchronized, the target player will actually not have been in that location. The game server then might have to retract the apparently completed action, or wait to determine whether the action is successful, either of which can significantly degrade the gaming experience.

Accordingly, approaches various embodiments can take advantage of multiple game servers that work together to manage a single game environment that is able to support a large number of players with minimal impact on gameplay due to latency and other such issues. In FIG. 3 it can be seen that there are multiple game servers 310, 312, 314 that are each associated with a subset of player devices that are active or participating in an active game session hosted by those game servers. The game servers can each execute the gaming application, and can each be responsible for managing game state for their respective subset of player devices. In embodiments, each player device may communicate with only one of the game servers, which has authority for the game state for that device (e.g., the state of entities controlled by that device). When an event occurs on one of the player devices (e.g., device 302), such as in response to user input to the device that corresponds to the game session, event data including information for the input (e.g., an input packet) can be transmitted from the player device 302 to the respective game server 310. That game server 310 can then be responsible for transmitting data for the event to the other game servers 312, 314 so that they have authoritative data corresponding to the event. These servers can similarly send event data from their respective devices to the first game server 310. In this way, all game servers have accurate game state data even though each individual game server only has authority over the state for a specific subset of devices (and corresponding entities) for the game.

As mentioned, the transmitted event data can include timing information as well, as may take the form of a time stamp specifying a time at which the input was received. In this way, a game server receiving that information can simulate the event as of the time in which the input was received or the event generated. Since this will have been received for an event that already occurred on the respective client device, this will effectively enable each receiving game server to "rewind" time and cause the event to be simulated for the time at which it occurred on the respective player device. This can help to ensure accurate gameplay even in the presence of latency, as a determination such as a hit or collision can be determined by the client device for the state of the game at the time of the input. A configuration such as that illustrated in FIG. 3 enables multiple game servers 310, 312, 314 to accurately manage game state while distributing authority for the various player devices. Although three servers are shown, in various embodiments any number of servers may be used in the same or similar manner as described above.

Figure 4:
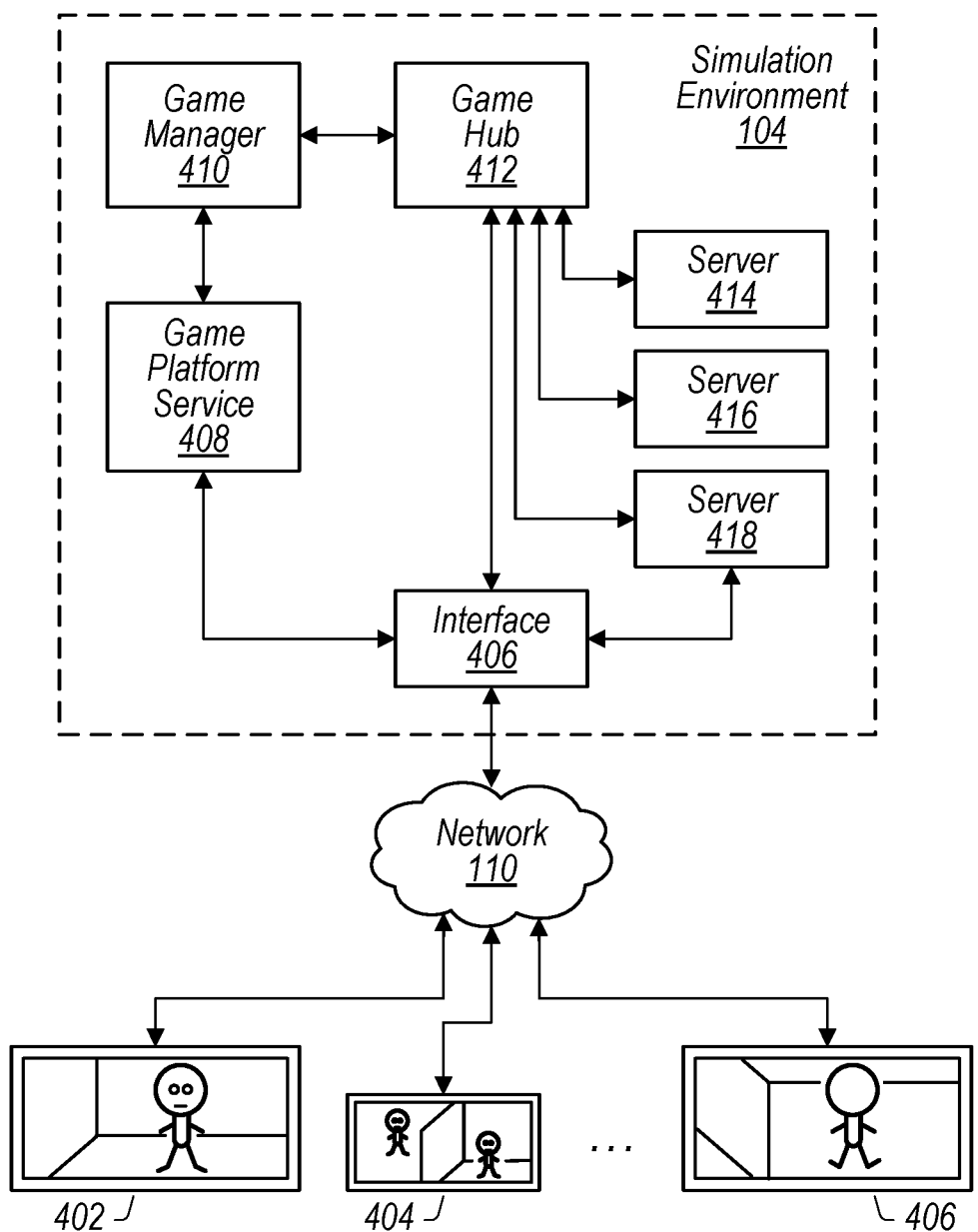
FIG. 4 is a logical block diagram illustrating a system for managing game state for multiple client devices, according to some embodiments.

FIG. 4 is a logical block diagram illustrating a system for managing game state for multiple client devices, according to some embodiments.

In this example, a game manager 410 can be allocated for each individual game or simulation for which at least one session is to be hosted. For at least certain types of games, the game manager 410 can manage one or more game hubs 412. A game hub 412 in the simulation environment 404 can be utilized or provided for each unique world, instance, space, or other type of simulation to which players can connect for participating in the session. A game hub 412 can be responsible for ensuring that there is a sufficient number of game servers 414, 416, 418 to support the number of concurrent (or anticipated) players for that environment of the gaming application. In some embodiments the game hub 412 can also spawn and manage its own game servers, which can correspond to machine instance or compute instances on one or more physical machines. In some embodiments, the game servers can be their own unique resource fleet within a gaming environment, with the game hub 412 configured to interact with the game manager 410 to acquire and release game servers as load demands fluctuate. In some embodiments, the game servers form a fully connected grid over a communication protocol such as the uniform data protocol (UDP) utilizing datagram transport layer security (DTLS), although many of the connections may be idle at any given time.

Player devices 402, 404, 406 can submit event data across at least one network 402 (e.g., network 110) that is received to an interface layer 406 of the simulation environment, which can direct the event data to the responsible game server for that player device with respect to the active game session. That game server can then be responsible for managing the corresponding input with respect to the active game session, which can include processing the input and propagating result data to the other game servers.

In one embodiment, the game hub 412 uses a one worker thread per core model, where both clients and game servers connect to the game hub 412 using persistent encrypted TLS connection. One listen thread can manage accepting incoming connections on the set of sockets, and can utilize round robin or another balancing approach to direct incoming connections to one of the worker threads. The worker threads can own their set of connections, with connection only ever being handled by the listen thread during an accept, and by the owning worker thread for the remainder of its lifetime. The worker threads can read and write game state from a common thread-safe shared data instance, which can itself own a game manager server session instance.

The game server instances can form a fully connected grid in one embodiment, so that any server can communicate directly with any other game server. A single game server can be responsible for a specific geographical region within the game world. The system can support static or dynamic partitioning of a game world across a set of servers. Each game server has authoritative control over a set of entities or resources that exist within its geographic region of interest, including the various player devices. The game servers that share neighboring geographical regions can share the state of the entities that lie along regional boundaries, for example, and can also manage the transition of entity authority between servers. Game clients or player devices (or software executing on those devices) can connect directly to the game server that has authoritative control of the player's entity/avatar (or other representation) in the game world. If a client's in-game avatar migrates from one game server to another, the client can disconnect from the previous server and connect to the new server, and this reconnection can be managed transparently to the player and game developer without negatively impacting gameplay.

As mentioned, each game server 414, 416, 418 receiving result data from another game server can apply that result data to the local players (e.g., entities) over which that server has authority with respect to the game or environment. As mentioned, a first server receiving the input data can perform a simulation of an event, corresponding to that input, for a relevant time in the past with respect to the active session, which enables the server to effectively rewind and cause the event to be processed as of the time at which the corresponding input was received. For example, the event data can include the throwing of a ball at a particular time from a particular location in the game world in a particular direction and with a particular velocity. The game server performing the simulation can simulate that action occurring at that time in the past with respect to the state of the game, as indicated by the timestamp in the event data, and can determine any impact on the state of the game for at least one other player, such as whether the ball hit a player avatar as a result of the throw. If so, the information about the contact, if that server has authority over that game state or avatar, etc., can be propagated to the other game servers such that the game servers will all have consistent game state information that is based on information from the respective authority in the game world.

FIGS. 5A-5E illustrate an example data flow for managing game state, according to some embodiments.

Figure 5A:
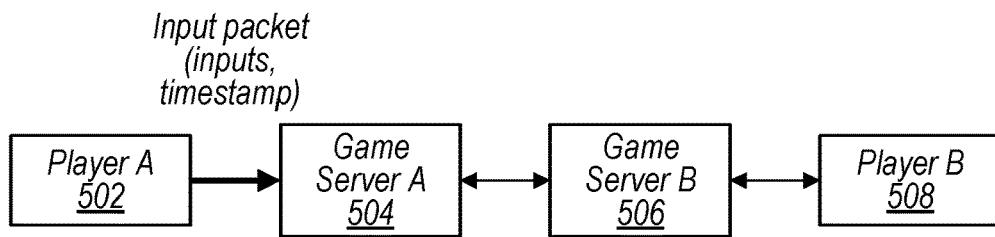
FIGS. 5A-5E illustrate an example data flow for managing game state, according to some embodiments.
Figure 5B:
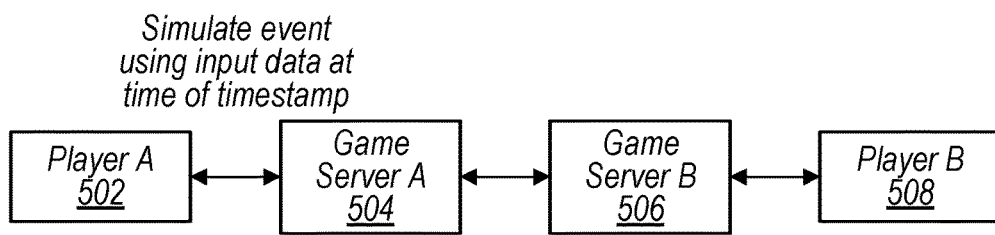
Figure 5C:
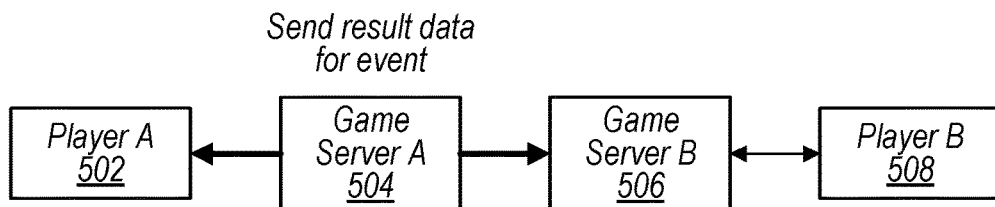
Figure 5D:
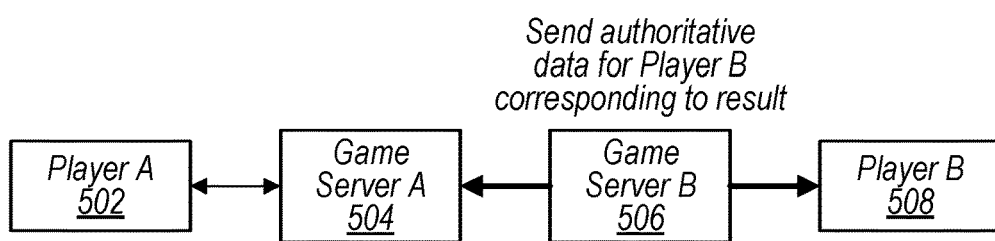
Figure 5E:
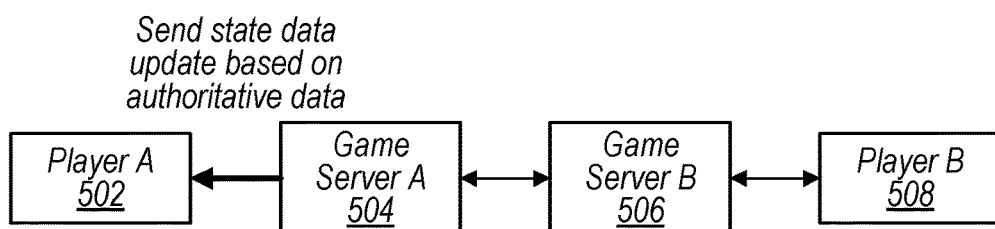

In FIG. 5A, input is received to a device 502 for Player A, and that input is sent to Game Server A 504. In FIG. 3B, Game Server A 504 processes the data and performs a simulation in order to determine the impact or result of the input. Server A can use the input data to update game state for Player A, which can be sent to the device for Player A. Server A can also replicate the call with the result data to be sent to Game Server B 506, which has authority for Player B 508, as illustrated in FIG. 3C. Game Server B 506 processes the result data and updates game state based on any determined impact of the event data. The authoritative data corresponding to the impact can then be sent to the device for Player B 508, as illustrated in FIG. 3D, in order to update the state of the game as displayed on that device, as well as to Game Server A 504 to update the game state for Player A 502 and any other players for which Server A 504 has authority. In the state 540 of FIG. 3E, Game Server A 504 can send the updated and authoritative state data to the device 502 for Player A in order to update the game state for display on the device. Various other flows can be utilized as well as discussed and suggested herein. In the depicted example, Server A does not communicate directly with Player B, nor does Server B communicate directly with Player A.

In some embodiments, when a server receives the event data and performs the simulation, the result will be a replicated copy of the state of one or more other players over which the server does not have authority. This information can be passed to one or more client player devices, which can then display and interact with avatars for those other players that are based on the cloned data. The player device can generate an instance of event data for an input action with respect to an avatar, such as when the player throws a ball at the avatar for the other player. The event data can include information such as the position, orientation, animation state, etc. That information is sent to the first server which has authority over that player device. Since that server does not have authoritative control over the other player, the server can indicate to the local player that the other player avatar was hit by the throw, but the server cannot modify the network properties for the other player because the authority for the other player is assigned to a different game server. In at least some embodiments a remote procedure call (RPC) or other type of function call will be sent between the servers indicating that the authoritative server should wield the appropriate result with respect to the other player. Since both game servers are protected behind the same backend architecture in these examples, there can be inherent trust between servers. A server receiving such a request can apply the damage as computed by the sending server, then replicate those properties after the application back down to both the second player device and the first server, which can then propagate to the device for the player who through the ball initially.

FIG. 6 is an illustration of changing components of an entity, according to some embodiments.

In embodiments, any number of components may be added to and/or removed from an entity of a simulation in order to add or remove locally predictive states for the entity. For example, a client device may receive, from a user, indications for different components to be added to (or removed from) an entity of a simulation. In embodiments, the components may be selected from a list of available components to be added (or removed). In some embodiments, one or more of the components may be defined by a user and saved at the client device and/or provider network so that they are available for adding to the entity or other entities at a later time.

In some embodiments, a component may specify any number of different types of input to be provided for the component (e.g., move forward, throw ball). The component may also specify any number of predictive states of the component that are to be predicted based on the different types of input. A predictive state of a given component may correspond to a state of the component to be determined at the provider network. For example, a predictive state for a ball throw component may be "hit entity B," and the provider network may determine the actual state based on the simulation at the provider network. In embodiments, any component may also have any number of non-predictive states (e.g., color of the ball, texture of the ball).

In the depicted example, a user has added to entity A 602 a movement component 604, a rotation component 606, and a ball throw component 608. The movement component specifies four types of input: "move forward," "move backward," "move left," and "move right." The movement component specifies the predictive state "position" that is to be predicted based on the four types of input. For example, receiving an input for the entity that corresponds to the "move forward" type of input (without receiving the other three types of input) may cause the client device to predict a "position" state that is located one meter in front of the current position of the entity in a direction the entity is facing in the simulation.

As shown, the rotation component specifies four types of input: "rotate left," "rotate right," "rotate up," and "rotate down." The rotation component specifies the predictive state "orientation" that is to be predicted based on the four types of input. For example, receiving an input for the entity that corresponds to the "rotate up" type of input (without receiving the other three types of input) may cause the client device to predict an "orientation" state of the entity in which the entity's body (or head) rotates up by one degree. The ball throw component specifies one type of input: "throw ball." The ball throw component specifies the predictive state "hit or miss target entity." For example, receiving a "throw ball" input while the entity is directly facing a target entity 5 meters away may cause the client device to predict "hit target entity."

In embodiments, the client device may remove any components from an entity in response to receiving a request/indication from a user to remove the components. As depicted, the client device receives, from a user, an indication that the movement component is to be removed from the entity A. In response, the client device removes the movement component from entity A. In some embodiments, a component(s) may be automatically removed from an entity as a result of the simulation. For example, the movement component may be removed, by the client device, from entity A in response to determining that entity A's legs have been paralyzed or stuck in a trap.

By removing components from an entity, the number of inputs and/or the size of the input packet that is generated and sent to the remote simulation may be smaller. This may reduce the amount of bandwidth consumed and the amount of time to process the input packet (e.g., due to fewer input fields in the input structure of an input packet). Conversely, by adding components to an entity, the number of inputs and/or the size of the input packet that is generated and sent to the remote simulation may be larger. In embodiments, the ability of the input packet structure (e.g., components, predictive states, etc.) of an entity to change through a simulation provides flexibility that is not present using other techniques. In embodiments, a particular client device may simulate/control any number of entities that may each include any number of components.

In embodiments, any number of inputs may be received by the client device that correspond to any number of the specified types of input for any number of the components of an entity (e.g., at any particular time/time period corresponding to a timestamp). The client device may use the inputs and predictive states to generate an input packet to be sent to a remote simulation. For example, if an entity looks up while throwing the ball, the input packet for entity A (after removal of the movement component) may include four input fields that have a value for the rotation component (e.g., "rotate up" for the "rotate up" field and a value of "0" or "null" for the other three fields). The input packet may also include an input field that has a value of "throw ball" for the "throw ball" field.

In embodiments, the predictive state for "orientation" may be "body orientation 91 degrees" and the predictive state for "hit or miss target entity" may be "miss entity C." In some embodiments, the predictive states may be sent to the remote simulation server as part of the input packet. The remote server may compare these predictive states with results (state values) of the simulation server and if the state values match, no correction is needed for the client device.

If the predictive state values do not match the state values of the simulation, a correction packet may be generated that includes the correct values for the states and is sent to the client device. The client device may apply the correct value(s) for the states to the entity to replace the incorrect values for the predictive states (e.g., over-write some or all of the values for the locally predicted states with the values for the correct states).

In some embodiments, instead of sending values for the predictive states that were locally predicted for the components of an entity, the client device will instead generate a fingerprint (or other unique identifying data) that is based on the values for the predictive states and send the fingerprint to the remote simulation server. For example, the client device may apply an algorithm (e.g., a hashing algorithm) that uses the values to generate the fingerprint. The fingerprint may uniquely identify the values with respect to different values for the predictive states. This results in generation of different (e.g., unique) fingerprints for different predictive states. The remote server may compare the fingerprint with another fingerprint that was generated using the state value of the simulation server and if the fingerprints match, no correction is needed for the client device. Otherwise, a correction packet may be generated and sent, as discussed above.

Figure 7:
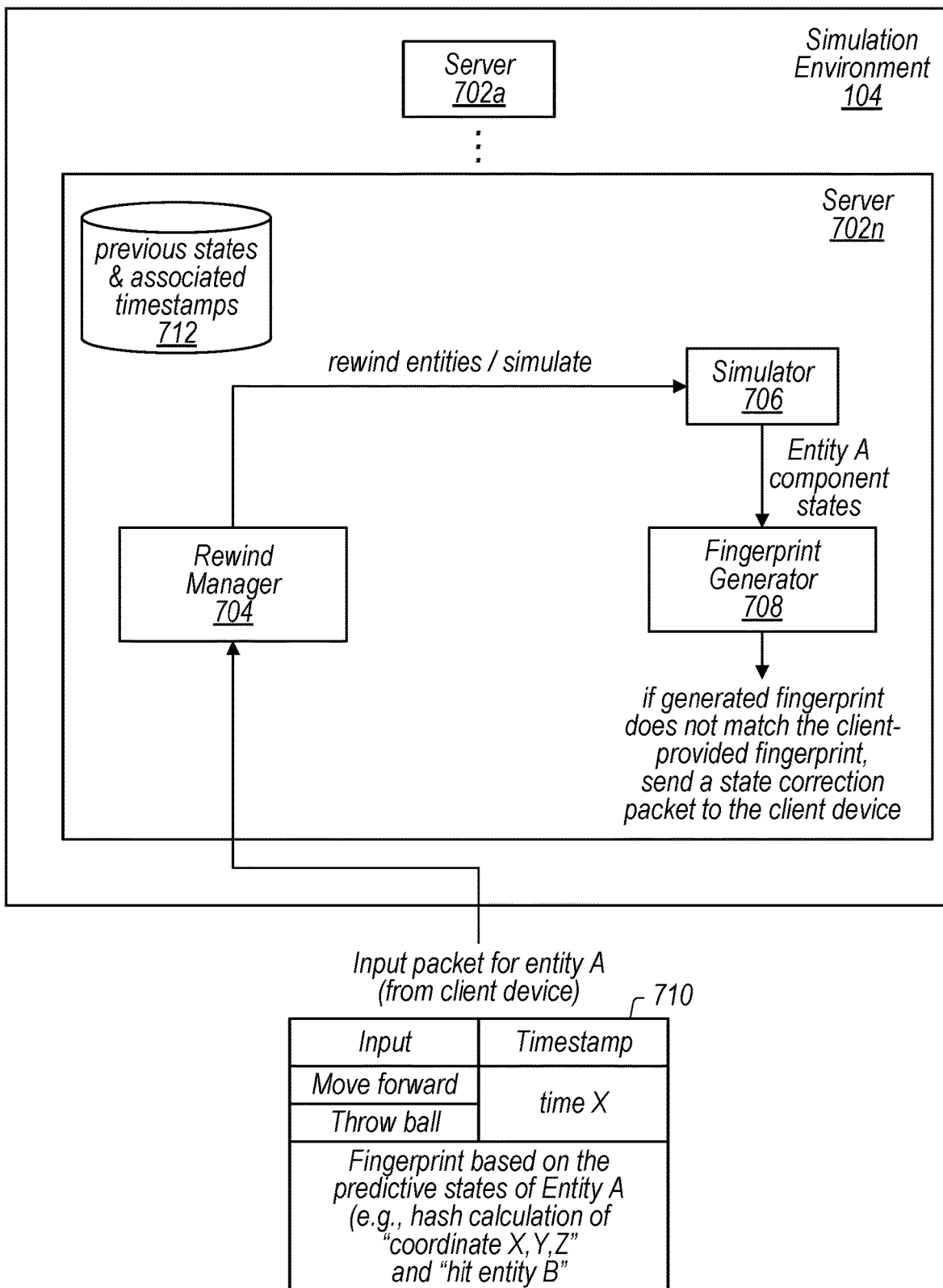
FIG. 7 is an illustration of processing an input packet for a componentized entity of a simulation, according to some embodiments.

FIG. 7 is an illustration of processing an input packet for a componentized entity of a simulation, according to some embodiments.

In the depicted embodiment, the simulation environment 104 may include a fleet of any number of servers 702 that implement a simulation for clients/client devices. In various embodiments, the servers may be physical servers and/or virtual servers (e.g., implemented by a compute instance). In embodiments, the number of servers may increase or decrease, depending on the load/processing required for the simulation (e.g., additional servers may be added as more clients join a game).

As shown, the server 702n includes a rewind manager 704, a simulator 706, and a fingerprint generator 708 that may perform various functions/operations of the simulation based on receiving an input packet 710 for an entity of the simulation (e.g., entity A of FIG. 1). The servers may also store any number of previous states and associated timestamps 712 in a data store (e.g., volatile memory and/or hard disk).

In the example embodiment, the input packet 710 specifies a "move forward" input and a "throw ball" input, as well as the timestamp for the inputs. In some embodiments, an input packet may have different timestamps for different inputs (in that case, the simulation environment may first simulate the inputs for the first timestamp, then the other inputs for later timestamps). The input packet for entity A also includes a fingerprint based on the values for the predictive states of entity A that were locally predicted at the client device (e.g., hash calculation of "coordinate X, Y, Z" and "hit entity B").

The rewind manager may rewind state for one or more entities of the simulation to a state corresponding to the timestamp and then the simulator may run the simulation to generate results (e.g., determine the values for states of entity A and/or other entities). The fingerprint generator may generate a fingerprint (using the same algorithm as the client device) based on the values for the states of entity A (e.g., based on state values that correspond to the predictive states specified for each component). If the fingerprints match, no correction is needed. If the fingerprints do not match, then a state correction packet may be generated and sent to the client device so that the correct states of the components can be applied to the entity replica that is simulated at the client device.

Figure 8:
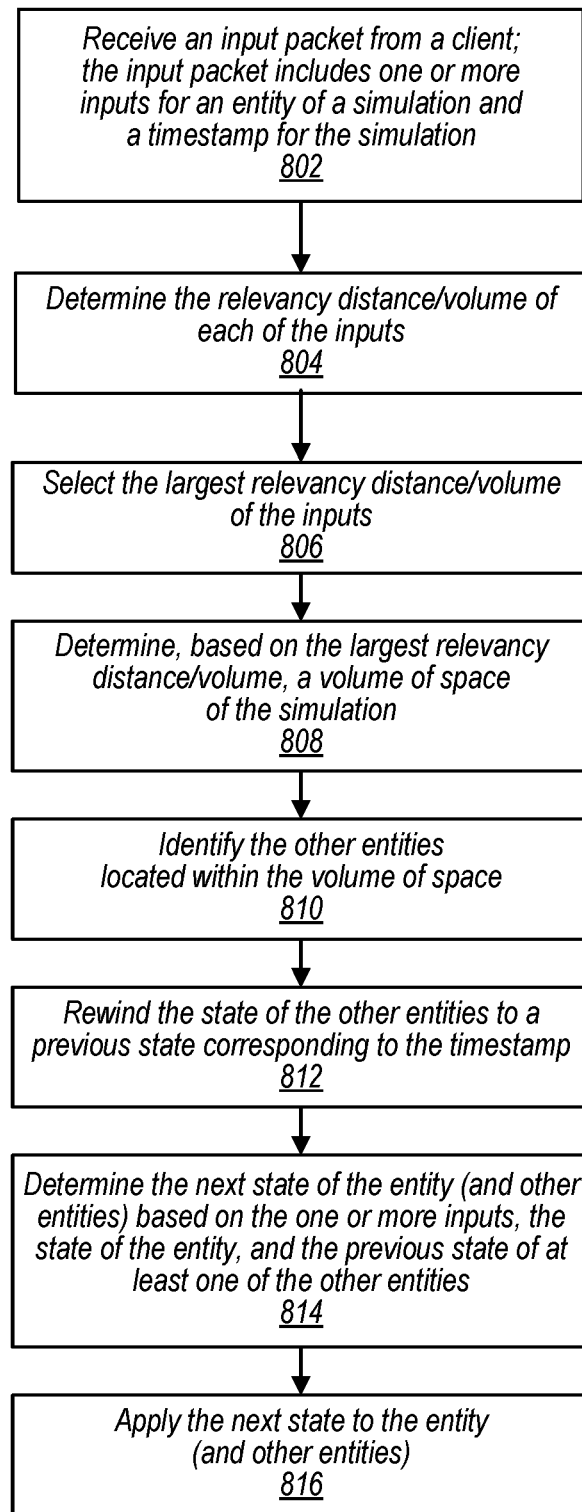
FIG. 8 is a high-level flowchart illustrating various methods and techniques to constrain the amount of simulation state to rewind based on input relevancy distance, according to some embodiments.

FIG. 8 is a high-level flowchart illustrating various methods and techniques to constrain the amount of simulation state to rewind based on input relevancy distance, according to some embodiments. In various embodiments, any of the functionality described for any portions of the flowcharts 8-10 may be performed by any of the components of FIGS. 1-7 and/or 11.

Figure 9:
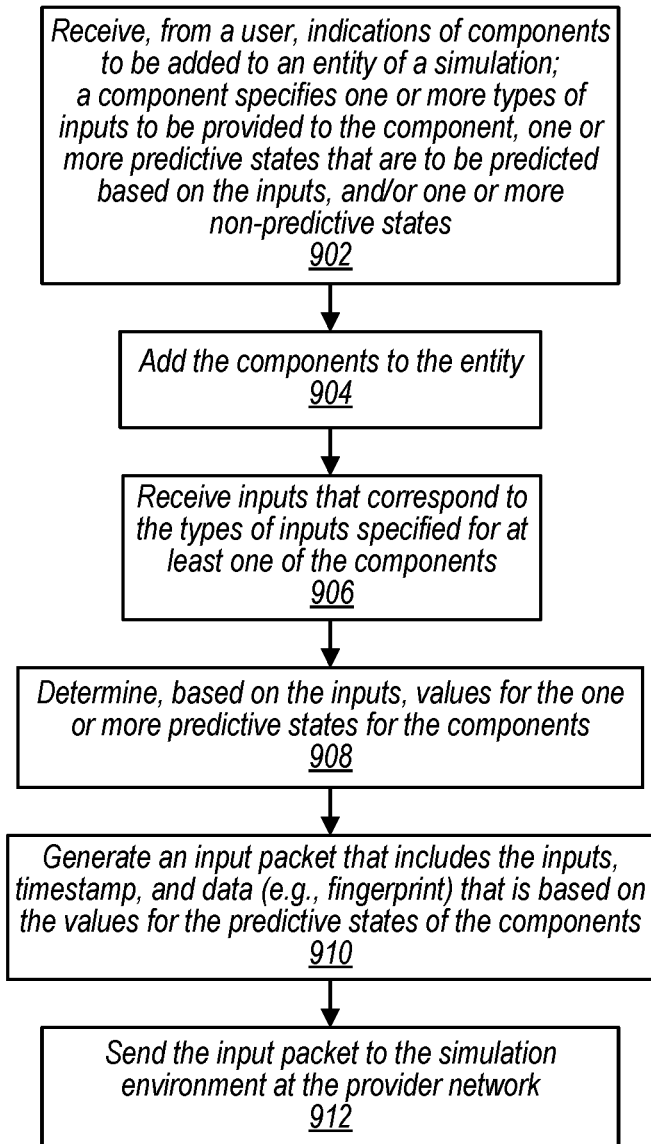
FIG. 9 is a high-level flowchart illustrating various methods and techniques to locally predict state using a componentized entity simulation, according to some embodiments.
Figure 10:
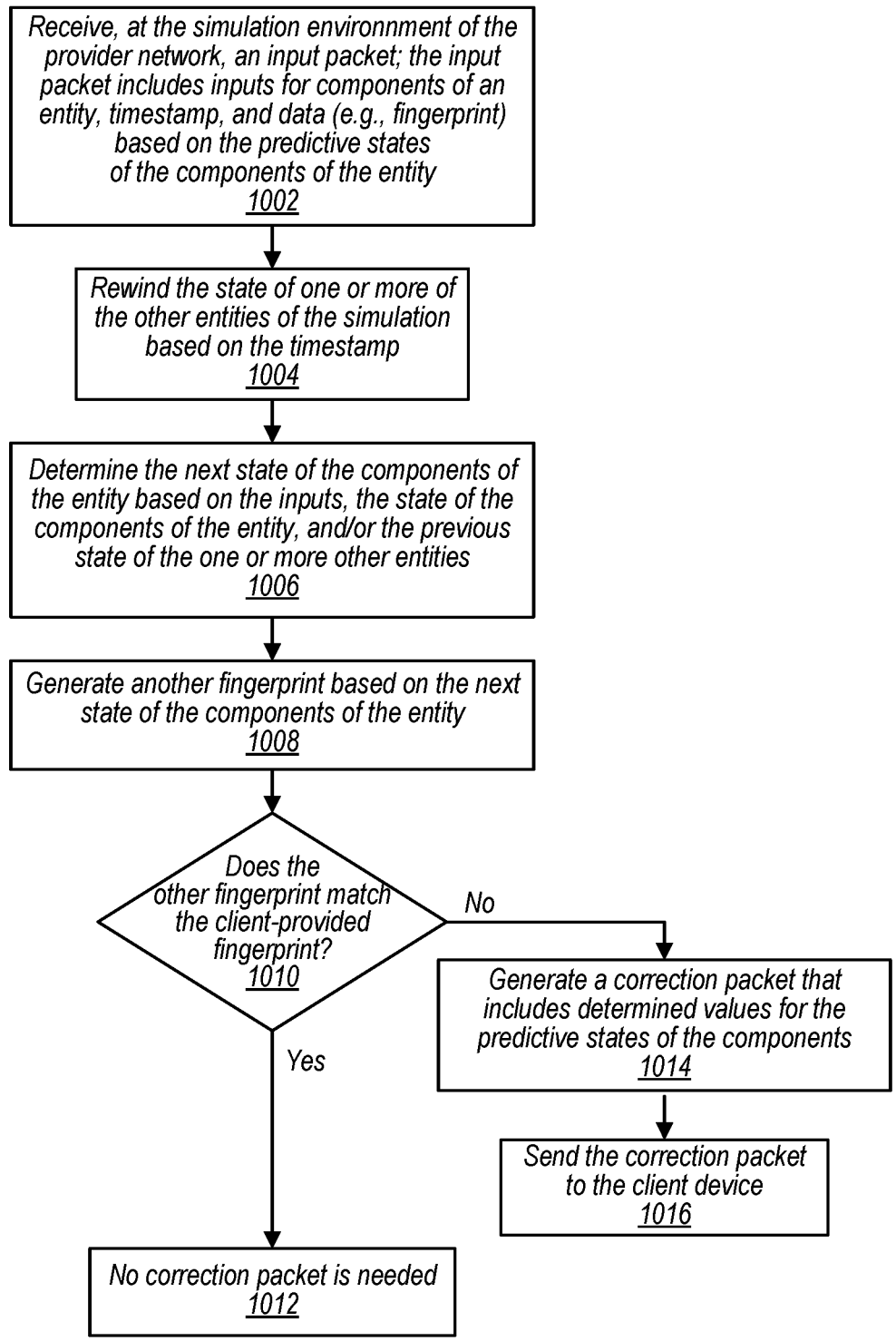
FIG. 10 is a high-level flowchart illustrating various methods and techniques to process an input packet for a componentized entity of a simulation, according to some embodiments.

These techniques, as well as the techniques discussed with regard to FIGS. 9 and 10, may be implemented using components or systems as described above with regard to FIGS. 1-7, as well as other types of components or systems, and thus the following discussion is not intended to be limiting as to the other types of systems that may implement the described techniques. For example, the techniques may be implemented by a simulation environment of a provider network and/or a client device.

At block 802, a simulation server receives an input packet from a client. The input packet includes one or more inputs for an entity of a simulation and a timestamp for the simulation. In embodiments, each input may be assigned to a component of the entity, as described herein. At block 804, the server determines the relevancy distance (or volume) for each of the inputs. For example, the server may iterate through each component and assigned component input(s) to determine the relevancy distance/volume for each input. At block 806, the server selects the largest relevancy distance (or volume) of the inputs. At block 808, the server determines, based on the largest input relevancy distance (or volume), a volume of space of the simulation (e.g., using the largest relevancy distance(s)/volume). In embodiments, the determined volume of space may be affected by one or more environmental factors.

At block 810, the server identifies the other entities located within the volume of space (e.g., as of the current time or as of the input timestamp). At block 812, the server rewinds the state of the other entities to a previous state corresponding to the timestamp. At block 814, the server determines the next state of the entity (and other entities) based on the one or more inputs, the state of the entity, and the previous state of one or more of the other entities. At block 816, the server applies the next state to the entity (and other entities). As discussed herein, a correction packet may be generated if the next state of the entity does not match the next state of the entity that was locally predicted at the client device.

FIG. 9 is a high-level flowchart illustrating various methods and techniques to locally predict state using a componentized entity simulation, according to some embodiments.

At block 902, a client device receives, from a user, indications of one or more components to be added to an entity of a simulation. A component may specify one or more types of inputs to be provided to the component, one or more predictive states that are to be predicted based on the inputs, and/or one or more non-predictive states. At block 904, the client device adds the components to the entity.

At block 906, the client device receives inputs that correspond to the types of inputs specified for at least one of the components. At block 908, the client device determines, based on the inputs, values for the one or more predictive states for the components. At block 910, the client device generates an input packet that includes the inputs, timestamp, and data (e.g., fingerprint) that is based on the values for the predictive states of the components. At block 912, the client device sends the input packet to the simulation environment at the provider network.

FIG. 10 is a high-level flowchart illustrating various methods and techniques to process an input packet for a componentized entity of a simulation, according to some embodiments.

At block 1002, the simulation server receives, at the simulation environment of the provider network, an input packet; the input packet includes inputs for components of an entity, timestamp, and data (e.g., fingerprint) based on the predictive states of the components. At block 1004, the server rewinds the state of one or more other entities of the simulation based on the timestamp.

At block 1006, the server determines the next state of the components of the entity based on the inputs, the state of the components of the entity at the server, and the previous state (rewound state) of the one or more other entities. At block 1008, the server generates another fingerprint based on the next state of the components of the entity.

At block 1010, the server determines whether the other fingerprint matches the client-provided fingerprint. If so, then at block 1012, no correction packet is needed. If not, then at block 1014, the server generates a correction packet that includes the determined values for the predictive states of the components. At block 1016, the server sends the correction packet to the client device.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of simulation environment and any other components that implement the techniques described herein). The various methods as illustrated in the figures and described herein represent example embodiments of methods. The order of any method may be changed, and various elements may be added, reordered, combined, omitted, modified, etc.

Figure 11:
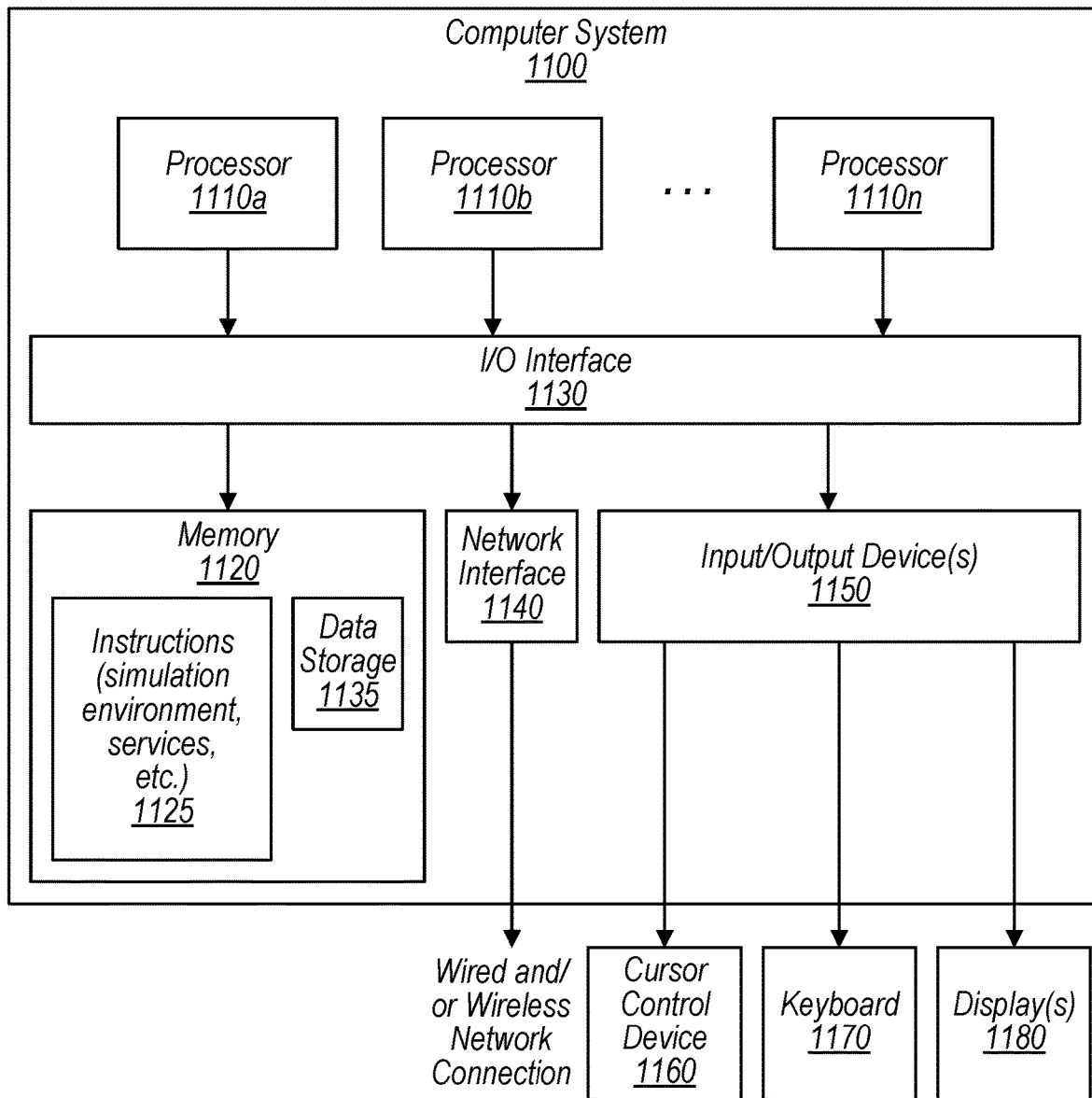
FIG. 11 is a block diagram illustrating an example computing system, according to some embodiments.

Embodiments to implement constraining the amount of simulation state to rewind based on input relevancy distance and/or locally predicting state using a componentized entity simulation, according to some embodiments, which may interact with various other systems or devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) may include standard computer monitor(s) and/or other display systems, technologies or devices, in one embodiment. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in one embodiment. For example, in various embodiments, processors 1110 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1120 may store program instructions 1125 and/or data accessible by processor 1110, in one embodiment. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., simulation environment and any other components, etc.) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in one embodiment.

In one embodiment, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in one embodiment. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in one embodiment. Multiple input/output devices 1150 may be present in computer system 1100 or may be distributed on various nodes of computer system 1100, in one embodiment. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125 that implement the various embodiments of the systems as described herein, and data store 1135, comprising various data accessible by program instructions 1125, in one embodiment. In one embodiment, program instructions 1125 may include software elements of embodiments as described herein and as illustrated in the Figures. Data storage 1135 may include data that may be used in embodiments (e.g., models, functions, telemetry data, etc.). In other embodiments, other or different software elements and data may be included.

Those skilled in the art will appreciate that computer system 1100 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A client device, comprising:
one or more processors; and
one or more memories, wherein the one or more memories have stored thereon instructions, which when executed by the one or more processors, cause the one or more processors to implement local predictions for a simulation at remote provider network, wherein the one or more processors are configured to:
receive, from a user, indications of a plurality of components to be added to an entity, wherein for a given component of the plurality of components, the component specifies:
one or more types of input to be provided for the component;
one or more predictive states of the component that are to be predicted based on the one or more types of input, wherein the one or more predictive states of the component correspond to states of the component to be determined at the provider network; and
one or more non-predictive states of the component;
add the plurality of components to the entity based on the indications received from the user to define behavior of the entity;
receive one or more inputs that correspond to one or more of the types of input specified for at least one of the plurality of components of the entity;
determine, based on the one or more inputs, values for the one or more predictive states for the plurality of components of the entity;
generate an input packet to be sent to the remote provider network, the input packet comprising at least:
the one or more inputs that were previously received before generation of the input packet; and
data based on the values for the one or more predictive states of the plurality of components of the entity that were determined based on the one or more inputs that were previously received before the generation of the input packet, wherein the input packet does not include data based on values for the one or more non-predictive states for the plurality of components of the entity; and
send the input packet to the provider network.

2. The system as recited in claim 1, wherein the data comprises a fingerprint, and wherein to generate the input packet, the one or more processors are configured to:
apply an algorithm that uses the values for the one or more predictive states for the plurality of components of the entity to generate the fingerprint, wherein the fingerprint uniquely identifies the values for the one or more predictive states with respect to other values for at least one of the one or more predictive states.

3. The system as recited in claim 1, wherein the one or more processors are configured to:
receive, from the user, an indication of one of the plurality of components to be removed from the entity;
remove the component from the entity, wherein the entity comprises a remaining number components;
receive one or more additional inputs that correspond to one or more of the types of input specified for at least one of the remaining number of components of the entity;
determine, based on the one or more additional inputs, additional values for the one or more predictive states for the remaining number of components of the entity;
generate an additional input packet comprising at least:
the one or more additional inputs, wherein a number of the one or more additional inputs is less than a number of the one or more inputs of the input packet; and
data based on the additional values for the one or more predictive states for the remaining number of components of the entity; and send the additional input packet to the provider network, wherein the additional input packet is smaller than the input packet.

4. The system as recited in claim 1, wherein the one or more processors are configured to:
receive, from the user, an indication of a new component to be added to the entity, wherein the new component specifies:
one or more additional types of input to be provided for the new component;
one or more additional predictive states of the new component that are to be predicted based on the one or more additional types of input, wherein the one or more new predictive states of the new component correspond to states of the new component to be determined at the provider network;
add the new component to the entity;
receive one or more additional inputs that correspond to one or more of the types of input specified for at least one of the plurality of components of the entity, wherein the one or more additional inputs comprises one or more inputs for the new component;
determine, based on the one or more additional inputs, additional values for the one or more predictive states for the plurality of components of the entity, wherein the additional values comprises values for the one or more additional predictive states of the new component;
generate an additional input packet comprising at least:
the one or more additional inputs, wherein a number of the one or more additional inputs is greater than a number of the one or more inputs of the input packet; and
data based on the additional values for the one or more predictive states for the plurality of components of the entity; and
send the additional input packet to the provider network, wherein the additional input packet is larger than the input packet.

5. The system as recited in claim 1, wherein the one or more processors are configured to:
receive, from the provider network, a correction packet, wherein the correction packet comprises at least one different value for the one or more predictive states for the plurality of components of the entity; and
apply the at least one different value for the one or more predictive states of the entity.

6. A method, comprising:
performing, by a client computing device that implements local predictions for a simulation at remote provider network:
receiving one or more inputs that correspond to one or more types of input specified for at least one of a plurality of components previously added to an entity based on indications received from a user to define behavior of the entity;
determining, based on the one or more inputs, values for one or more predictive states specified for the plurality of components of the entity;
generating an input packet to be sent to the remote provider network, the input packet comprising at least:
the one or more inputs that were previously received before generation of the input packet; and
data based on the values for the one or more predictive states of the plurality of components of the entity that were determined based on the one or more inputs that were previously received before the generation of the input packet, wherein the input packet does not include data based on values for one or more non-predictive states for the plurality of components of the entity; and
sending the input packet to the provider network.

7. The method as recited in claim 6, wherein the data comprises a fingerprint, and wherein generating the input packet comprises:
applying an algorithm that uses the values for the one or more predictive states for the plurality of components of the entity to generate the fingerprint, wherein the fingerprint uniquely identifies the values for the one or more predictive states with respect to other values for at least one of the one or more predictive states.

8. The method as recited in claim 7, wherein applying the algorithm comprises applying a hashing algorithm using the values for the one or more predictive states.

9. The method as recited in claim 6, wherein the input packet further comprises a timestamp, wherein the timestamp corresponds to a time of the simulation at which the one or more inputs are to be applied in the simulation.

10. The method as recited in claim 6, further comprising:
removing one of the plurality of components from the entity, wherein the entity comprises a remaining number of components;
receiving one or more additional inputs that correspond to one or more of the types of input specified for at least one of the remaining number of components of the entity;
determining, based on the one or more additional inputs, additional values for the one or more predictive states for the remaining number of components of the entity;
generating an additional input packet comprising at least:
the one or more additional inputs, wherein a number of the one or more additional inputs is less than a number of the one or more inputs of the input packet; and
data based on the additional values for the one or more predictive states for the remaining number of components of the entity; and
sending the additional input packet to the provider network, wherein the additional input packet is smaller than the input packet.

11. The method as recited in claim 6, further comprising:
adding a new component to the entity, wherein the new component specifies:
one or more additional types of input to be provided for the new component;
one or more additional predictive states of the new component that are to be predicted based on the one or more additional types of input, wherein the one or more new predictive states of the new component correspond to states of the new component to be determined at the provider network;
receiving one or more additional inputs that correspond to one or more of the types of input specified for at least one of the plurality of components of the entity, wherein the one or more additional inputs comprises one or more inputs for the new component;
determining, based on the one or more additional inputs, additional values for the one or more predictive states for the plurality of components of the entity, wherein the additional values comprises values for the one or more additional predictive states of the new component;
generating an additional input packet comprising at least:

the one or more additional inputs, wherein a number of the one or more additional inputs is greater than a number of the one or more inputs of the input packet; and data based on the additional values for the one or more predictive states for the plurality of components of the entity; and sending the additional input packet to the provider network.

12. The method as recited in claim 6, further comprising:

receiving one or more other inputs that correspond to one or more other types of input specified for at least one of a plurality of components previously added to another entity to define different behavior of the other entity;

determining, based on the one or more other inputs, values for one or more other predictive states specified for the plurality of components of the other entity;

generating another input packet comprising at least:
the one or more other inputs; and
a fingerprint based on the other values for the one or more other predictive states of the plurality of components of the other entity, wherein the other input packet does not include data based on values for one or more non-predictive states for the plurality of components of the other entity; and sending the other input packet to the provider network.

13. The method as recited in claim 6, further comprising:

receiving, from the provider network, a correction packet, wherein the correction packet comprises at least one different value for the one or more predictive states for the plurality of components of the entity; and applying the at least one different value for the one or more predictive states of the entity.

14. The method as recited in claim 13, further comprising, for an outstanding input packet that was generated based on subsequent inputs received by at least one of the components of the entity after the one or more inputs:

determining, based on the subsequent inputs, updated values for the one or more predictive states specified for the plurality of components of the entity;

generating an updated input packet based on subsequent inputs and the updated values; and sending the updated input packet to the provider network.

15. One or more non-transitory computer-accessible storage media storing program instructions that when executed on or across one or more processors of a client device that implements local predictions for a simulation at remote provider network, cause the one or more processors to:

receive one or more inputs that correspond to one or more types of input specified for at least one of a plurality of components previously added to an entity based on indications received from a user to define behavior of the entity;

determine, based on the one or more inputs, values for one or more predictive states specified for the plurality of components of the entity;

generate an input packet to be sent to the remote provider network, the input packet comprising at least:
the one or more inputs that were previously received before generation of the input packet; and
an identifier based on the values for the one or more predictive states of the plurality of components of the entity that were determined based on the one or more inputs that were previously received before the generation of the input packet, wherein the input packet does not include data based on values for one or more non-predictive states for the plurality of components of the entity; and send the input packet to the provider network.

16. The one or more storage media as recited in claim 15, wherein the data comprises a fingerprint, and wherein the instructions when executed on or across the one or more processors cause the one or more processors to:

apply an algorithm that uses the values for the one or more predictive states for the plurality of components of the entity to generate the fingerprint, wherein the fingerprint uniquely identifies the values for the one or more predictive states with respect to other values for at least one of the one or more predictive states.

17. The one or more storage media as recited in claim 15, wherein the input packet further comprises a timestamp, wherein the timestamp corresponds to a time of the simulation at which the one or more inputs are to be applied in the simulation.

18. The one or more storage media as recited in claim 15, wherein the instructions when executed on or across the one or more processors cause the one or more processors to:

remove one of the plurality of components from the entity, wherein the entity comprises a remaining number of components;

receive one or more additional inputs that correspond to one or more of the types of input specified for at least one of the remaining number of components of the entity;

determine, based on the one or more additional inputs, additional values for the one or more predictive states for the remaining number of components of the entity;

generate an additional input packet comprising at least:
the one or more additional inputs, wherein a number of the one or more additional inputs is less than a number of the one or more inputs of the input packet; and
data based on the additional values for the one or more predictive states for the remaining number of components of the entity; and send the additional input packet to the provider network, wherein the additional input packet is smaller than the input packet.

19. The one or more storage media as recited in claim 15, wherein the instructions when executed on or across the one or more processors cause the one or more processors to:

add a new component to the entity, wherein the new component specifies:
one or more additional types of input to be provided for the new component;
one or more additional predictive states of the new component that are to be predicted based on the one or more additional types of input, wherein the one or more new predictive states of the new component correspond to states of the new component to be determined at the provider network;

receive one or more additional inputs that correspond to one or more of the types of input specified for at least one of the plurality of components of the entity, wherein the one or more additional inputs comprises one or more inputs for the new component;

determine, based on the one or more additional inputs, additional values for the one or more predictive states for the plurality of components of the entity, wherein the additional values comprises values for the one or more additional predictive states of the new component;

generate an additional input packet comprising at least:
  the one or more additional inputs, wherein a number of the one or more additional inputs is greater than a number of the one or more inputs of the input packet; and
  data based on the additional values for the one or more predictive states for the plurality of components of the entity; and
send the additional input packet to the provider network.

20. The one or more storage media as recited in claim 15, wherein the instructions when executed on or across the one or more processors cause the one or more processors to:
receive one or more other inputs that correspond to one or more other types of input specified for at least one of a plurality of components previously added to another entity to define different behavior of the other entity;
determine, based on the one or more other inputs, values for one or more other predictive states specified for the plurality of components of the other entity;
generate another input packet comprising at least:
  the one or more other inputs; and
  a fingerprint based on the other values for the one or more other predictive states of the plurality of components of the other entity, wherein the other input packet does not include data based on values for one or more non-predictive states for the plurality of components of the other entity; and
send the other input packet to the provider network.

* * * * *